United States Patent [19]

Matsuura

[11] Patent Number: 5,329,258
[45] Date of Patent: Jul. 12, 1994

[54] MULTILEVEL FSK MODULATOR HAVING PHASE LOCKED LOOP WITH CONTROLLED TRANSIENT RESPONSE

[75] Inventor: Takashi Matsuura, Tokyo, Japan

[73] Assignee: Nec Corporation, Japan

[21] Appl. No.: 77,723

[22] Filed: Jun. 16, 1993

[30] Foreign Application Priority Data

Jun. 26, 1992 [JP] Japan .................................. 4-168107

[51] Int. Cl.[5] .......................................... H04L 27/12
[52] U.S. Cl. .................................. 332/100; 332/127;
375/48; 375/62; 375/66
[58] Field of Search ............... 332/100, 101, 102, 127;
375/48, 62, 66

[56] References Cited

U.S. PATENT DOCUMENTS

| 4,068,198 | 1/1978 | Otto ..................................... 332/19 |
| 5,111,162 | 5/1992 | Hietala et al. .................. 332/100 X |
| 5,130,676 | 7/1992 | Mutz .................................. 332/100 |

FOREIGN PATENT DOCUMENTS

| 2535545 | 5/1984 | France . |
| 57-135555 | 8/1982 | Japan . |

OTHER PUBLICATIONS

European Telecommunications Standards Institute, "Paging Systems; European Radio Message System (ERMES), Part 6: Base Station Conformance Specification", Oct. 1991.

Primary Examiner—Siegfried H. Grimm
Attorney, Agent, or Firm—Ostrolenk, Faber, Gerb & Soffen

[57] ABSTRACT

A multilevel frequency-shift keying (FSK) modulator is disclosed in which the transient response for frequency transition can be easily set. The modulator is of a type in which a frequency generated by a voltage-controlled oscillator (VCO) is changed in accordance with multilevel code and is phase-locked by a phase-locked loop (PLL). The modulator is provided with a phase-lock feedback circuit that, combined with a VCO, makes up a PLL, and includes first and second VCOs and a filter having a desired transient response characteristic. At a transient time of frequency transition due to a change of the multilevel code, the first VCO and feedback circuit makes up the PLL, and a first control voltage for the first VCO produced in the PLL is inputted as a second control voltage to the second VCO through the filter. Accordingly, the FSK signal delivered from the second VCO has a transient response characteristic depending on the characteristic of the filter, and as a result, the transient response characteristic of the FSK modulator can be set to a desired characteristic by modifying the characteristic of the filter without changing the other circuit parameters.

5 Claims, 3 Drawing Sheets

MULTILEVEL FSK MODULATOR HAVING PHASE LOCKED LOOP WITH CONTROLLED TRANSIENT RESPONSE

BACKGROUND OF THE INVENTION

1. Field of the Invention

The present invention relates to a multilevel Frequency Shift Keying (FSK) modulator, and particularly to a multilevel FSK modulator applicable to a transmitter for a paging system.

2. Description of the Related Art

As is well known, the FSK (Frequency Shift Keying) format has the advantages that modulated signals transmitted according to this format are of constant envelope wave form, and consequently, there is little level fluctuation or noise, and that modulating and demodulating circuits can be easily constructed. Modulation according to the FSK format is carried out either by switching n number of oscillators corresponding to an n-level input signal, or by controlling the voltage-controlled oscillator (VCO) according to the control voltage signal corresponding to the input signal. In the latter case, the modulating circuit includes a phase-locked loop (PLL) in order to stabilize the frequency.

The European Telecommunication Standards Institute (ETSI) established the standards for the European Radio Message System (ERMES) as a new paging system in 1991. According to these standards, it is established that the term "symbol" is defined as Two bits of information which are the basic unit of information on the air interface. It corresponds to one of the four modulation levels specified in subclause 9.3.1 of ETS 300 133-4 (4). [cf. Paging System: European Radio Message System (ERMES), Part 6: Base station conformance specification, 3 Definition];

that four-level pulse amplitude modulated FM (4-PAM/FM) is used as the modulation format [cf. ibid. 6.2 Modulation]; and that a rise (or fall) time of $88\mu$ sec for the frequency transition between two successive symbols is the standard of the transient response characteristic of the modulator [cf. ibid. 6.2.1 Symbol Transition Shaping].

FIG. 1 is a block diagram showing an example from the prior art of a multilevel FSK modulator applicable to the above-described paging system. This modulator carries out 4-level FSK modulation in response to an input data signal $D_i$ composed of a 2-bit symbol.

The voltage-controlled oscillator 1 is controlled by a phase-locked feedback circuit made up of a programmable frequency divider 2, a phase comparator 3, a loop filter 4, and a standard oscillator 5 and generates a 4-level FSK modulated signal S1. A frequency divider 7 frequency-divides the 4-level FSK modulated signal S1 and converts it to a signal S2 having a prescribed frequency shift. A mixer 8 mixes a local signal S3 supplied from a local oscillator 9 with signal S2 and converts the signal S2 so that it has a prescribed center frequency. An output filter 10 is made up of a filter circuit having a linear-phase characteristic and a band pass characteristic that passes a desired frequency band in order to prevent generation of high frequency components due to frequency transition and eliminate unnecessary frequency components, and transmits an output signal $S_0$.

In operation, a data converter 6 receives input data $D_i$, sets a scale factor n corresponding to each 2-bit symbol, produces a signal Cn indicating the scale factor and delivers it to the programmable frequency divider 2. The voltage-controlled oscillator 1 changes the oscillation frequency in response to the control voltage Cv and outputs signal S1. The programmable frequency divider 2 frequency-divides the signal S1 according to the scale factor n designated by signal Cn and sends the output signals Sn to the phase comparator 3. The phase comparator 3 compares the phases of standard signal Ss generated by the standard oscillator 5 and frequency-divided signal Sn and produces, by way of the loop filter 4, a voltage corresponding to the phase difference as the control voltage Cv.

As an example, it is assumed that the range of oscillation frequency of the voltage-controlled oscillator 1 is 61 MHz–67 MHz and the scale factor set by the data converter 6 is n=67 when the symbol is "10",
n=65 when the symbol is "11",
n=63 when the symbol is "01", and
n=61 when the symbol is "00".

Furthermore, by making the frequency of standard signal Ss 1 MHz, the frequency f1 of signal S1 can be controlled as follows:

f1=67 MHz when the symbol is "10"
f1=65 MHz when the symbol is "11"
f1=63 MHz when the symbol is "01"
f1=61 MHz when the symbol is "00"

In other words, a 4-level FSK signal having frequency that shifts corresponding to four symbols can be produced. In addition, the scale factor of the divider 7 is set in order to achieve a fixed frequency shift. For example, if the scale factor is 640, the frequency f2 of signal S2 is as follows:

f2=100 kHz+4687.5 Hz when the symbol is "10"
f2=100 kHz+1562.5 Hz when the symbol is "11"
f2=100 kHz−1562.5 Hz when the symbol is "01"
f2=100 kHz−4687.5 Hz when the symbol is "00"

In the above-described multilevel FSK modulator of the prior art, the 4-level FSK signals are produced by controlling, in accordance with input data Di, the scale factor to be supplied to the programmable frequency divider provided in the phase-locked loop. Accordingly, the transient response for frequency transition of the FSK signal due to a change in the input symbol (known as symbol transition shaping by ETSI) is determined by the response (step response) characteristic of the phase-locked loop. As is easily understood from automatic control theory, it is no simple matter to set the parameters of the loop circuit such that the loop circuit will have both a desired transient response characteristic and stable characteristics free of overcontrol or oscillating behavior. This point has been a key problem with FSK modulators to date. An additional problem has been that, when revising the transient response characteristic of a PLL, it is necessary to revise the phase characteristic of the output filter provided on the output terminal side as well, which involves redesigning and readjusting of the output filter.

The multilevel FSK modulator described above is a typical example of an FSK modulator that employs a PLL, but an example of an FSK modulator that does not employ a PLL is disclosed in Japanese Patent Laid-open No. 135555/82. The FSK modulator that uses a PLL and an FSK modulator described below that does not use a PLL will hereinafter be referred to as the first and second FSK modulators of the prior art, respectively.

The second FSK modulator of the prior art is intended to narrow the bandwidth of the spectrum of the output modulated signal by smoothing the phase change at the transition point from mark to space of an input data signal (a modulating signal). To this end, when altering the scale factor at the transition between mark and space, subdivided intervals are provided that take intermediate values of the scale factor between the marking and spacing intervals, and the frequency transition is made from the mark to space frequencies through subfrequencies corresponding to the subintervals, or vice versa.

Because this FSK modulator does not employ a PLL, difficulty is to be expected in obtaining a stable center frequency or a stable frequency shift, and there are also the following additional problems: because the frequency of the output modulated signal is produced by dividing the standard frequency by a programmable frequency divider, the standard frequency must be a common multiple of the output frequency. However, in the above-mentioned ERMES paging system in which the frequency shift of an output signal is prescribed, for example, to be 4.6875 kHz, 1.5625 kHz, −1.5625 kHz, −4.6875 kHz (i.e., if the center frequency is 100 kHz, the output frequency is (100+4.6875) kHz, (100+1.5625) kHz, (100−1.5625) kHz, (100−4.6875) kHz), it is difficult to set the standard frequency at a common multiple of these output frequencies; moreover, the second FSK modulator of the prior art is not provided with a means to regulate the response characteristic for the transition between the mark and intermediate frequencies and the transition between the intermediate and space frequencies. Accordingly, in a case in which symbol transition shaping for an ERMES paging system is prescribed as (88±2)μ sec., it is difficult for the second FSK modulator of the prior art to satisfy the required conditions.

SUMMARY OF THE INVENTION

The purpose of the present invention is to provide a PLL-type multilevel FSK modulator that allows easy revising of the transient response characteristic of the output frequency for a change in the input symbol without altering the circuit parameters of the PLL circuit or altering the phase or amplitude characteristic of the output filter.

In order to achieve this aim, the multilevel FSK modulator of the present invention is provided with:

a phase-locked feedback circuit that outputs, as a control voltage signal for a voltage-controlled oscillator means constituting a phase-locked loop, a signal produced by inputting the output signal of a voltage-controlled oscillator means, producing a frequency-divided signal by frequency-dividing the output signal of the voltage controlled oscillator means by a scale factor corresponding to an inputted multilevel code and producing and smoothing the signal corresponding to a phase difference between the frequency-divided signal and a standard signal;

a first and a second voltage-controlled oscillator means each having identical characteristics;

filter means that inputs the control voltage signal and outputs a signal having a prescribed transient response characteristic;

switching control means that detects changes of the multilevel code, and when the multilevel code changes, outputs a first switching control signal during a prescribed period following the change and outputs a second switching control signal during the period other than the prescribed period; and switching means that, during-the time the first switching control signal is being outputted, connects the first voltage-controlled oscillator means to the phase-locked feedback circuit in order to form a phase lock loop and connects the output of the filter means to the control voltage input of the second voltage-controlled oscillator means, and during the time that the second switching control signal is being outputted, breaks both the connection between the output of the filter means and the control voltage input of the second voltage-controlled oscillator means and the connection between the first voltage-controlled oscillator means and the phase-locked feedback circuit, and connects the second voltage-controlled oscillator means to the phase-locked feedback circuit in order to form a phase-locked loop.

When the multilevel code changes, because the output frequency of the second VCO means at that transition time is controlled by the control voltage signal that changes in accordance with the transient response characteristic of the filter means, the transient response characteristic of the FSK modulator can be modified by freely changing the transient response characteristic of the filter means without altering the PLL circuit parameters or altering the amplitude characteristic or phase characteristic of the output filter.

Furthermore, at stationary times other than transition times, because the PLL is made up of the second VCO means combined with the phase-locked feedback circuit, it is possible to obtain a FSK modulated signal that does not give rise to discontinuity due to switching between transition times and stationary times by using the output of the second VCO as the FSK modulated signal at either transition times or stationary times.

The above and other objects, features, and advantages of the present invention will become apparent from the following description referring to the accompanying drawings which illustrate an example of a preferred embodiment of the present invention.

DETAILED DESCRIPTION OF THE PREFERRED EMBODIMENTS

The present invention will be explained below with reference to the figures.

Figure 1:
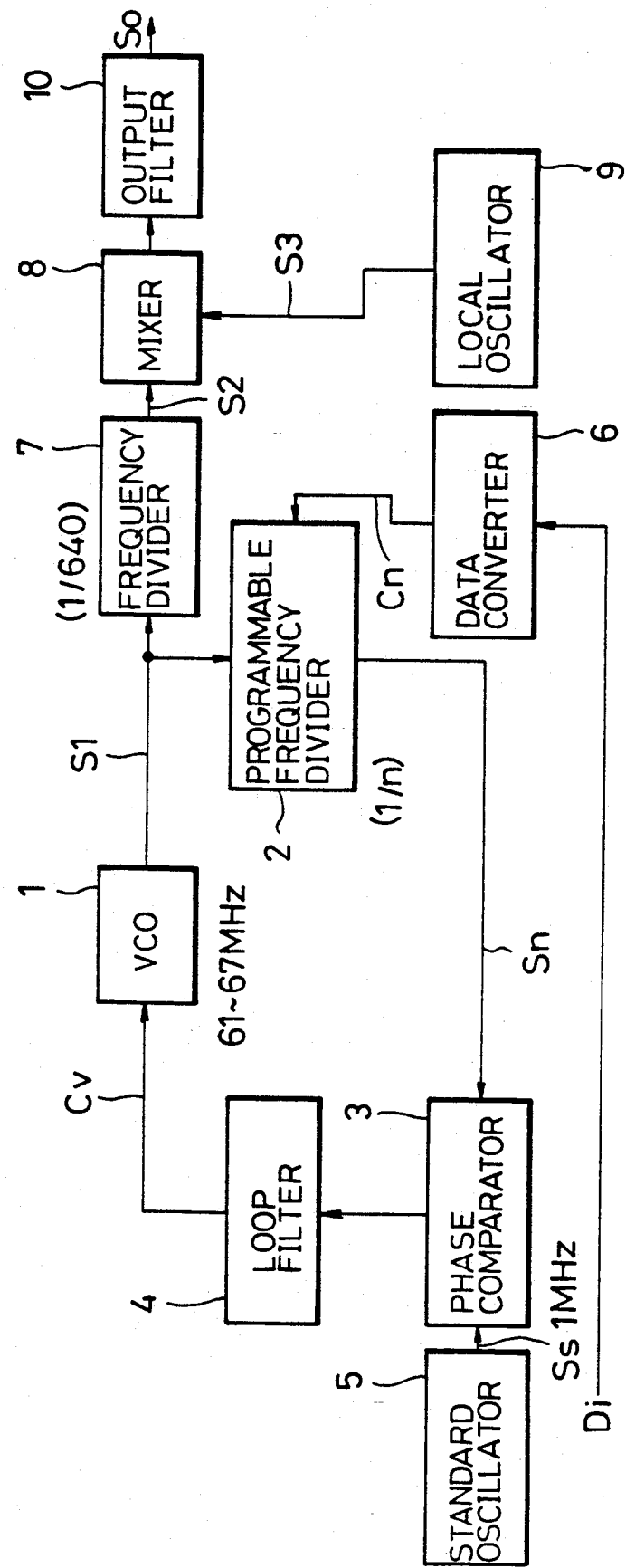
FIG. 1 is a block diagram showing an example of a multilevel FSK modulator of the prior art.
Figure 2:
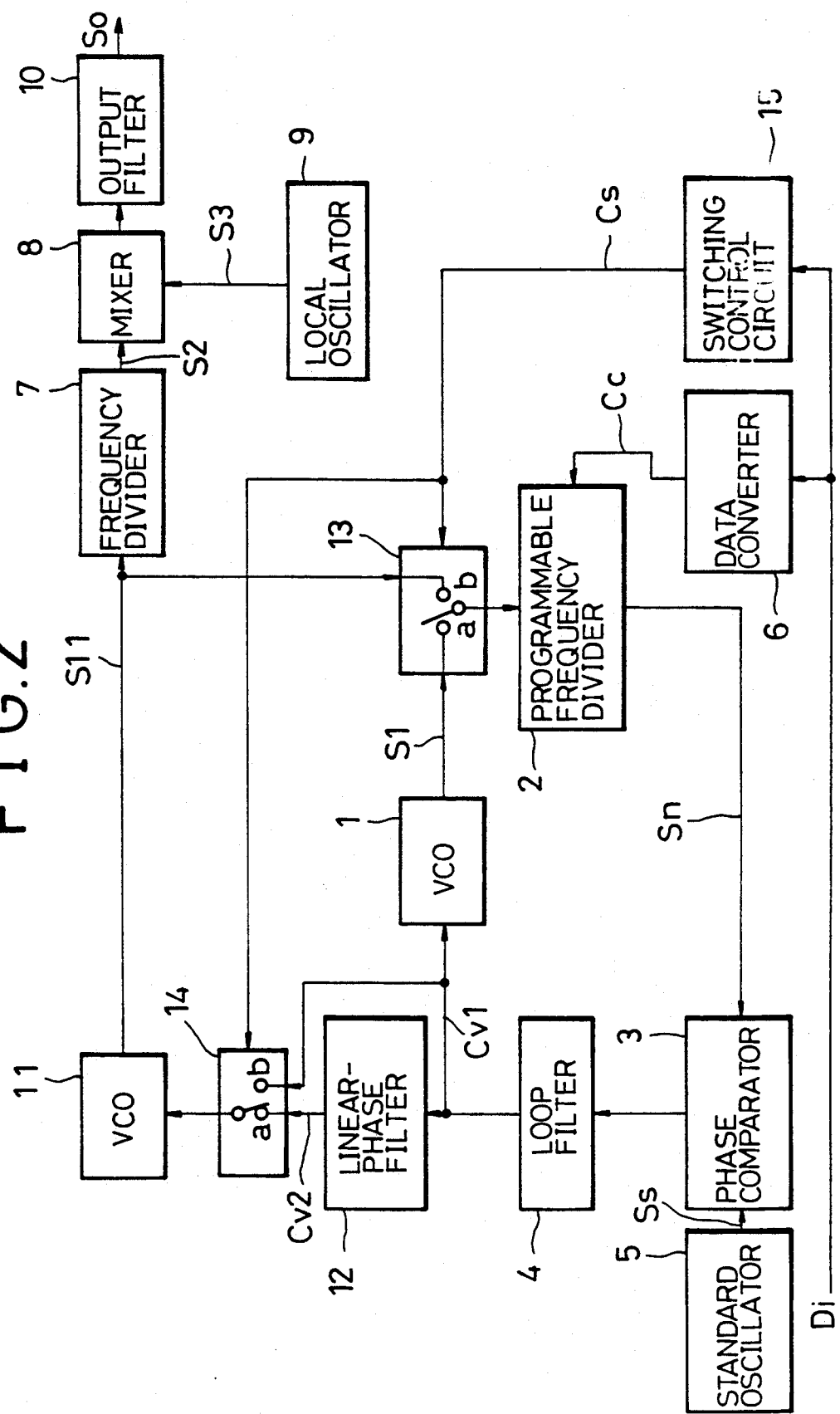
FIG. 2 is a block diagram of an embodiment of the present invention.

FIG. 2 is a block diagram showing an embodiment of the present invention. The parts identical to those shown in FIG. 1 are labeled with the same reference numerals. The multilevel FSK modulator of the present embodiment is composed of, in addition to the components of the apparatus of FIG. 1, a voltage-controlled oscillator 11 that forms a second phase-locked loop when it is combined with the phase-locked feedback circuit, a linear-phase filter 12 that establishes the transient response characteristic of the output frequency, two switches 13, 14 for switching first and second phase-locked loop, and a switching control circuit 15.

The first phase-locked loop, in the same manner as the phase-locked loop shown in FIG. 1, is made up of a voltage-controlled oscillator 1, a programmable frequency divider 2, a phase comparator 3 and a loop filter 4, and functions when the contact of switch 13 is switched to side a. The second phase-locked loop is made up of a voltage-controlled oscillator 11, a programmable frequency divider 2, a phase comparator 3, and a loop filter 4, and functions when the contact of switches 13, 14 are switched to side b. Voltage-controlled oscillator 1 and voltage-controlled oscillator 11 have the same characteristic, are each controlled by control voltages Cv1 and Cv2, respectively, and produce 4-level FSK modulated signals S1 and S11, respectively.

The divider 7 frequency-divides the 4-level FSK modulated signal S11 and converts it to an FSK signal S2 with a prescribed frequency shift. The mixer 8 mixes signal S2 with a local signal S3 supplied from a local oscillator 9, and provides signal S2 with a predetermined center frequency. The output filter 10, which is a band pass filter having linear-phase characteristics, eliminates unnecessary frequency components of the FSK modulated signal outputted from the mixer 8 and sends the signal on as output signal So.

The operation will next be described.

Figure 3:
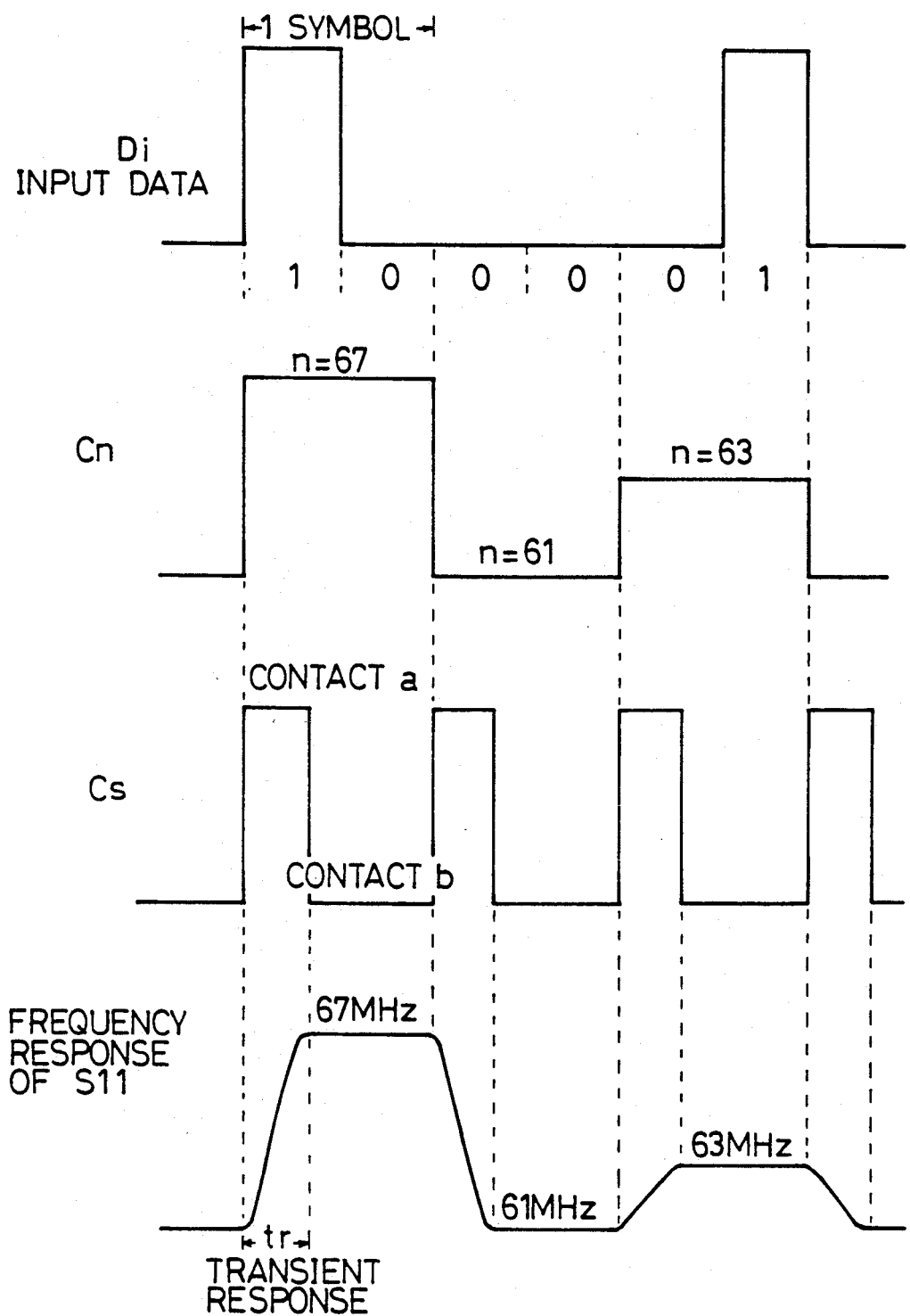
FIG. 3 is a wave form diagram illustrating the operation of an embodiment of the present invention.

The present embodiment, in the same manner as the prior art FSK modulator shown in FIG. 1, carries out 4-level FSK modulation in response to input data Di that is a modulating signal in which one symbol is made up of two bits, as will be explained with reference to FIG. 3.

When the data converter 6 receives data Di such as "100001", it produces and delivers to the programmable frequency divider 2 a signal Cn indicating scale factors "67", "61" and "63" corresponding to 2-bit symbols "10", "00" and "01". The switching control circuit 15 detects the time that the symbol of input data Di changes and delivers a switching control signal Cs, switches the contacts of switches 13, 14 to side a for only the transient response time of the frequency transition, and subsequently, switches the contacts back to side b. When the symbol of input data Di does not change, it keeps the contacts of switches 13, 14 on side b.

When the contacts of switches 13, 14 are switched to side a, the first phase-locked loop is closed and a control voltage Cv1 is produced in order to cause the output frequency S1 of voltage-controlled oscillator 1 to make a transition to a frequency corresponding to the detected symbol change, and in addition, the control voltage Cv1 is supplied as a control voltage Cv2 to voltage-controlled oscillator 11 in a free-running state by way of both linear-phase filter 12 and contact a of switch 14. The linear-phase filter 12 is a linear-phase band limited filter such as a Bessel filter, and converts a rapidly rising (falling) input signal Cv1 to a slowly rising (falling) output signal Cv2 that makes a change at a prescribed gradient. Next, by switching the contacts of switches 13, 14 to side b, a second phase-locked loop is formed and a control voltage Cv1 is supplied by way of contact point b of switch 14 in order to control the output frequency of the voltage-controlled oscillator 11 to a frequency corresponding to the symbol presently being inputted.

In this manner, the transient response characteristic of a signal S11 delivered from voltage-controlled oscillator 11 can be revised depending on the transient response characteristic of the linear-phase filter 12. For example, if the period that contacts of switches 13, 14 are switched to side a equals the rise time $t_r$ for transition of a symbol in a paging system, the group delay characteristic of the linear-phase filter is established in accordance with the equation [linear-phase filter response]=$t_r$−[loop filter response].

It is to be understood that variations and modifications of the multilevel FSK modulator disclosed herein will be evident to those skilled in the art. It is intended that all such modifications and variations be included within the scope of the appended claims.

What is claimed is:

1. A multilevel FSK modulator comprising:
   a phase-locked feedback circuit that outputs, as a control voltage signal for a voltage-controlled oscillator means constituting a phase-locked loop, a signal produced by inputting the output signal of the voltage-controlled oscillator means, producing a frequency-divided signal by frequency-dividing the output signal of the voltage-controlled oscillator means by a scale factor corresponding to an inputted multilevel code and producing and smoothing the signal corresponding to the phase difference between the frequency-divided signal and a standard signal;
   a first and a second voltage-controlled oscillator means each having identical characteristics;
   filter means that inputs said control voltage signal and outputs a signal having a prescribed transient response characteristic;
   switching control means that detects changes of said multilevel code, and when the multilevel code changes, outputs a first switching control signal during a prescribed period following the change and outputs a second switching control signal during the period other than said prescribed period; and
   switching means that during the time the first switching control signal is being outputted, connects the first voltage-controlled oscillator means to the phase-locked feedback circuit in order to form a phase lock loop and connects the output of the filter means to the control voltage input of the second voltage-controlled oscillator means, and during the time that the second switching control signal is being outputted, breaks both the connection between the output of the filter means and the control voltage input of the second voltage-controlled oscillator means and the connection between the first voltage-controlled oscillator means and the phase-locked feedback circuit, and connects the second voltage-controlled oscillator means to the phase lock feedback circuit in order to form a phase-locked loop.

2. The multilevel FSK modulator according to claim 1 wherein the filter means is a linear-phase filter.

3. The multilevel FSK modulator according to claim 2 wherein the group delay characteristic of the linear-phase filter is determined in accordance with the difference arrived at by subtracting the response of said phase-locked loop from said prescribed period during which the switching control means outputs the first switching control signal.

4. The multilevel FSK modulator according to claim 3 wherein said multilevel code is a symbol defined for a paging system in which said multilevel FSK modulator is used.

5. The multilevel FSK modulator according to claim 4 wherein said prescribed period is determined depending on the rise time for frequency transition corresponding to the transition between two successive symbols defined for said paging system.

* * * * *